Feb. 3, 1925.
A. G. RONNING ET AL
1,524,887
ENSILAGE REDUCER AND ELEVATOR
Filed Aug. 2, 1920    2 Sheets-Sheet 1
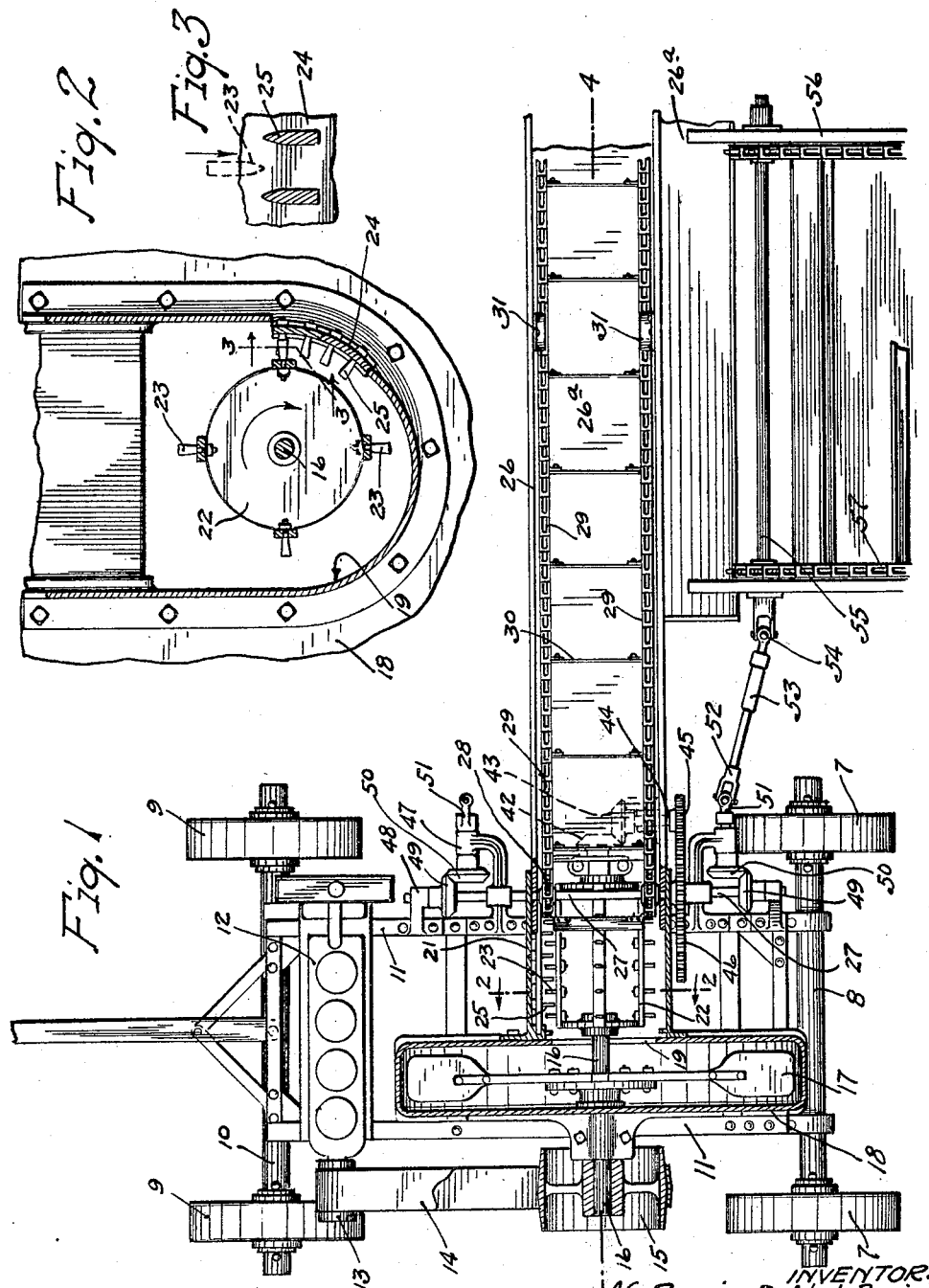
INVENTORS
A.G. Ronning & Adoph Ronning
BY THEIR ATTORNEYS

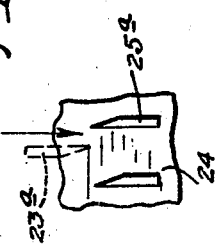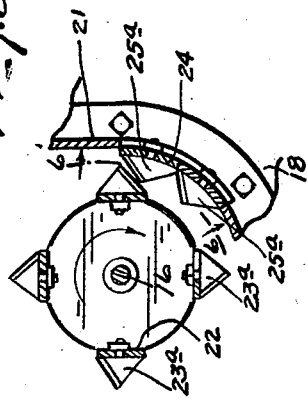

Patented Feb. 3, 1925.

1,524,887

UNITED STATES PATENT OFFICE.

ANDREAN G. RONNING AND ADOLPH RONNING, OF MINNEAPOLIS, MINNESOTA.

ENSILAGE REDUCER AND ELEVATOR.

Application filed August 2, 1920. Serial No. 400,622.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Ensilage Reducers and Elevators; and we do hereby declare the following to be a full, clear, and exact description of the invention, such as will enable others skilled in the art to which it appertains to make and use the same.

Our present invention is particularly directed to the provision of a simple and highly efficient combined pneumatic elevator and ensilage reducer; and to such ends, generally stated, the invention consists of the novel devices and combinations of devices hereinafter described and defined in the claims.

The invention also involves various other novel and important features which adapt the improved machine for use in unloading, carrying vehicles equipped with unloading devices, in conveying material, such as coarsely cut ensilage to the ensilage reducer, and from thence, delivering the reduced ensilage to a silo, or elsewhere, by means of the pneumatic elevator.

The improved machine is illustrated in the accompanying drawings wherein like characters indicate like parts throughout the several views.

Referring to the drawings:

Fig. 1 is a view chiefly in plan but with some parts in horizontal section showing the improved combined pneumatic elevator and its reducer coupled to a carrying vehicle, such as a manure spreader that is equipped with an unloading device;

Fig. 2 is an enlarged fragmentary view in vertical section on the line 2—2 of Fig. 1;

Fig. 3 is a fragmentary section on the line 3—3 of Fig. 2;

Fig. 4 is a section taken approximately on the line 4—4 of Fig. 1, some parts being shown in full;

Fig. 5 is a view corresponding to Fig. 2, but illustrating a modified arrangement of the ensilage reducing teeth of the ensilage reducer; and Fig. 6 is a fragmentary view showing parts in the immediate vicinity of the line marked 6—6 on Fig. 5.

Preferably, and as shown, the various parts of the improved machine here designated as a combined pneumatic elevator and ensilage reducer, are carried on a truck comprising rear wheels 7, rear axle 8, front wheels 9, and front axle 10, and a suitable connecting framework indicated, as an entirety, by the numeral 11.

Mounted on the truck frame 11 is a motor in the form of an internal combustion engine 12, the crank shaft of which carries a driving pulley 13. The belt 14 runs over the pulley 13 and over a driven pulley 15 that is secured to one end of a fan shaft 16 that carries a blade-equipped head 17. Located in a vertical plane within the fan casing 18 that is rigidly secured to the truck frame 11, is an axial intake eye or opening 19 and a tangentially projected discharge stack 20. A hopper-like housing 21 in the ensilage reducer is bolted, or otherwise rigidly secured to the fan casing and at its open inner end delivers directly into the eye of the fan. The fan shaft 16 is journaled in suitable bearings on the fan casing 18 and on the housing. The housing 21 is open at its top, and at its outer end is open above the shaft 16.

The ensilage reducer, which is in the nature of an ensilage cutter, preferably designed to cut coarse ensilage to fine condition, may take various forms, but preferably, and as shown, comprises a cylinder 22 located within the housing 21, carried by the fan shaft 16 and provided with radially projecting teeth or blades 23 that are sharp on their advance edges, directions being taken in respect to the arrows marked on Figs. 2 and 3. The bottom of the housing 21 is of nearly semi-cylindrical, but of slightly concentric form, an into the same is rigidly set a concave 24 provided with teeth or blades 25 that are sharp on their edges, against which the ensilage is forced by the tightened cylinder. Preferably, the cylinder is of skeleton structure made up of laterally spaced heads and connecting bars, much like that of a cylinder of a threshing machine. By reference particularly to Fig. 2, it will be noted that, in respect to the direction of rotation of the cylinder 22, the curved bottom of the hopper 21 has constantly increasing clearance from the teeth of the cylinder in a radial direction from the axis of the cylinder. This gives freedom for rapid discharge of the finely cut ensilage after it passes the teeth of the cylinder and has been reduced, either by being cut to shorter length, or by being shredded, according to the character of the teeth of the ensilage reducer.

The numeral 26 indicates a trough-like conveyor frame provided with a deck 26ª between its vertical side boards. The side boards of this conveyor frame 26, at their inner ends, project beyond the deck 26ª, embrace the upper portions of the sides of the hopper-like housing 21 and are pivoted thereto, either on or around the axis of a transverse shaft 27, which is projected through and journaled in the sides of the hopper. Between the sides of the frame 26, shaft 27 is provided with sprockets 28 over which run the sprocket chains 29 of an endless conveyor made up of said chains and cross slats 30. The endless conveyor 29—30 runs over and under the deck 26ª and at its outer portion runs over suitable idle guide wheels or sprockets not shown, but which will be loose on the extreme outer end of the frame 26 in a manner well understood. The deck 26ª has an oblique or angular inner portion, and to cause the conveyor chains 26 to closely follow said deck, the said chains are run under guide shoes 31 and 32 fixed to the sides of the frame 26.

Preferably, the conveyor frame 26 is, in part, counterpoised by a spring-actuated device of the character disclosed and claimed in our pending application S. N. 400,623 filed of date, August 2, 1920, and entitled "Pneumatic elevator," and hence, this counterpoising device may be briefly noted as follows:

The numeral 33 indicates a lever pivoted to the top of the fan casing, provided at its pivoted end with a small sector 34 and have its long free end connected to the sides of the frame 26 by a chain 35 and a yoke 36. The segment 34 is connected by a short cable 37 and a bolt 38 that works through a bracket 39 on the fan casing and is provided with a nut-held washer 40, between which and said bracket, a coiled spring 41 is compressed. The tension of the spring 41, acting through the lever connection described, should be such that it will hold the carrier frame 26 in a raised position when it is once turned upright, but will not be sufficient to lift the same from its operative approximately horizontal position.

At its right hand end, as shown in the drawings, the fan shaft 16 is provided with a beveled gear 42 that meshes with beveled gear 43 that is carried by a short shaft 44 journaled in suitable bearings on the housing 21 and provided at its front end with a spur pinion 45. The spur pinion 45 meshes with spur gear 46 carried by the shaft 27, already noted. This shaft 27, as previously stated, is journaled in the sides of the housing 21, but it will now be noted that at its extended front and rear ends, it is also journaled in bearing pedestals 47 and 48 on the main frame 11. At its front and rear ends, said shaft 27 carries beveled gears 49 that mesh with beveled gears 50 on short front and rear shafts 51, which latter are journaled in the bearing pedestal 47 and have forked outer ends adapted to be connected by knuckle joints 52 and a telescopically extensible tumbler shaft 53. This tumbler shaft 53 is, or is adapted to be coupled by a knuckle joint 54 to one end of a shaft 55 of the unloading or discharge device of an independent carrying vehicle, such as a manure spreader which is or may be of well known construction, is indicated by the numeral 56 and its rotary discharge or unloading device which includes the shaft 55, is indicated by the numeral 57, the same being of a slat and chain type.

The conveyor frame 26 is provided with a detachable receiving hopper 26ª that is adapted to be applied to either side thereof, so that by coupling the shaft 55 to either one of the two shafts 51, by means of the shaft 53, the carrying vehicle may be unloaded from either side of the conveyor of said conveyor frame.

In the modification of the ensilage reducer illustrated in Figs. 5 and 6, the cylinder 22, instead of having the form of teeth above described, is provided with teeth or cutting blades 23ª, much as the type used on mower cycle bars, and the concave 24, instead of having the form of teeth previously described, will have similar cutting blades 25ª. This form of ensilage reducer will be more efficient for finely cutting up the ensilage into shorter sections, while the form of teeth first described will have somewhat more the effect of shredding the coarsely cut ensilage.

The operation of the machine described is probably obvious from the foregoing description, but may be briefly summed up as follows:

The coarsely cut ensilage will be carried to the machine by the manure spreader or other carrying vehicle and the discharge device thereof will be coupled to one or the other of the shafts 51, as described. Then when the engine falls into action, the fan, the ensilage reducer, the endless conveyor and the unloading or discharge device of the carrying vehicle will all be driven. The coarse ensilage will be delivered from the manure spreader or carrying vehicle onto the carrying belt 29—30, and by the latter will be carried to the ensilage reducer, which, as shown, comprises the toothed cylinder 22 and tooth concave 24, and under action of this ensilage reducer, the ensilage will be reduced in fineness, either by cutting or shredding and, while it is subject to the reducing action, will be drawn constantly toward and finally into the fan casing. Of course, the ensilage, immediately upon being introduced into the fan casing, will be taken up by the direct action of the fan and the blast and will be discharged outward through the stack 20 of the pneumatic elevator and deposited in the silo or elsewhere, as desired. Thus, by continuous progressive action, the coarse ensilage will be unloaded, delivered to the ensilage reducer, reduced in form and discharged, all from the power of the single engine on the truck of the combined reducer and elevator.

What we claim is:

1. An ensilage machine comprising an ensilage disintegrator, a movable feeding means for feeding material to said disintegrator, a material-transporting vehicle adapted to transport material from a distance to said disintegrator feeding means and having a relatively movable feeding means thereon, a motor, and two independent operating means operated by said motor, one of said operating means being operatively connected to one of said movable feeding means and the other being operatively and detachably connected to the other movable feeding means.

2. An ensilage machine comprising an ensilage disintegrator, a motor for operating the same, a movable feeding means for feeding material to said disintegrator, a material-transporting vehicle adapted to transport material from a distance to said disintegrator feeding means and having relatively movable feeding means thereon and two independent operating means operated by said disintegrator motor, one of said operating means being operatively connected to said movable feeding means for the disintegrator and the other operatively and detachably connected to the movable feeding means on the vehicle.

3. The structure defined in claim 1 in which the operating means connecting said motor to the movable feeding means on said vehicle includes a telescopically extensible knuckle-jointed shaft.

4. The structure defined in claim 2 in which the operating means connecting said motor to the movable feeding means on said vehicle includes a telescopically extensible knuckle-jointed shaft.

5. The structure defined in claim 2 in which said disintegrator includes a rotary cutter, a casing for said cutter, said casing having a feed passage in one side, said movable feeding means to said disintegrator being extended outward from said feed passage, the movable feeding means on said vehicle being arranged to move longitudinally thereof and to deliver to one side of the feeding means for said disintegrator.

In testimony whereof we affix our signatures.

ANDREAN G. RONNING.
ADOLPH RONNING.